(12) United States Patent
Huang et al.

(10) Patent No.: US 11,356,531 B2
(45) Date of Patent: *Jun. 7, 2022

(54) DATA CACHING FOR CLOUD SERVICES

(71) Applicant: Citrix Systems, Inc., Fort Lauderdale, FL (US)

(72) Inventors: Feng Huang, Girton (GB); Duncan Spencer Gabriel, Cambridge (GB); Simon Frost, Hitchin (GB); Ross Large, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 85 days.

This patent is subject to a terminal disclaimer.

(21) Appl. No.: 17/020,265

(22) Filed: Sep. 14, 2020

(65) Prior Publication Data
US 2020/0412829 A1   Dec. 31, 2020

Related U.S. Application Data

(63) Continuation of application No. 15/944,107, filed on Apr. 3, 2018, now Pat. No. 10,805,421.

(51) Int. Cl.
| | |
|---|---|
| *H04L 67/5682* | (2022.01) |
| *G06F 12/084* | (2016.01) |
| *H04L 9/40* | (2022.01) |
| *G06F 9/50* | (2006.01) |
| *G06F 12/12* | (2016.01) |
| *H04L 67/1008* | (2022.01) |
| *H04L 67/306* | (2022.01) |

(Continued)

(52) U.S. Cl.
CPC ......... *H04L 67/2852* (2013.01); *G06F 9/505* (2013.01); *G06F 9/5072* (2013.01); *G06F 12/084* (2013.01); *G06F 12/12* (2013.01); *H04L 63/10* (2013.01); *H04L 67/1008* (2013.01); *H04L 67/16* (2013.01); *H04L 67/2842* (2013.01); *H04L 67/306* (2013.01); *G06F 9/5077* (2013.01); *G06F 2212/154* (2013.01)

(58) Field of Classification Search
None
See application file for complete search history.

(56) References Cited

U.S. PATENT DOCUMENTS 11,228,490 B1 *   1/2022   Carroll ............... H04L 67/1097

FOREIGN PATENT DOCUMENTS

| CN | 101609432 A | 12/2009 |
|---|---|---|
| CN | 101609432 B | 4/2011 |

(Continued)

OTHER PUBLICATIONS

Nov. 10, 2021—(EP) First Examination Report—App. 19714920.6.

(Continued)

*Primary Examiner* — Jeffrey R Swearingen
(74) *Attorney, Agent, or Firm* — Banner & Witcoff, Ltd.

(57) ABSTRACT

Methods and systems for caching data for resources using a shared cache are described herein. The data may be stored in a configuration service, in the resources, or in the shared cache. The data stored in the configuration service may be modified. The data stored in the resources and in the shared cache may be updated according to the modified data in the configuration service. The data stored in the configuration service, in the resources, or in the shared cache may be used based on an operation mode.

20 Claims, 8 Drawing Sheets

(51) Int. Cl.
   *H04L 67/51* (2022.01)
   *H04L 67/568* (2022.01)

(56) References Cited

FOREIGN PATENT DOCUMENTS

| | | | |
|---|---|---|---|
| CN | 102428685 | A | 4/2012 |
| CN | 102985921 | A | 3/2013 |
| EP | 0637799 | A2 | 2/1995 |
| JP | 2001-344145 | A | 12/2001 |
| JP | 2002-373107 | A | 12/2002 |
| JP | 2003-006036 | A | 1/2003 |
| JP | 2009-140290 | A | 6/2009 |
| JP | 2009-259206 | A | 11/2009 |
| JP | 2014-095946 | A | 5/2014 |
| WO | 2011041709 | A1 | 4/2011 |
| WO | 2017188871 | A1 | 11/2017 |

OTHER PUBLICATIONS

"Axway API Gateway Version 7.4.1," Sep. 18, 2017 (Sep. 18, 2017), pp. 1,2;-387-394, Retrieved from the Internet: URL:https://docs.axway.com/bundle/APIGateway_741_PolicyDevGuide_allOS_en_PDF/raw/resource/enus/APIGateway_PolicyDeveloperGuide_allOS_en.pdf. [retrieved on Sep. 13, 2021].
Nov. 10, 2021—(AU) Notice of Acceptance—App. 2019248441.
Dec. 16, 2021—(JP) Office Action—App 2020-552263.
Sep. 29, 2021—(CN) Notice of Allowance—App 201980026717.4.
Wikipedia contributors, "In-memory Database," Wikipedia, The Free Encyclopedia, pp. 1-4, https://en.wikipedia.org/wiki/In-memory_database (accessed Apr. 3, 2018).
Wikipedia contributors, "HTTP ETag," Wikipedia, The Free Encyclopedia, pp. 1-4, https://en.wikipedia.org/wiki/HTTP_ETag (accessed Apr. 3, 2018).
Wikipedia contributors, "Fingerprint (computing)," Wikipedia, The Free Encyclopedia, pp. 1-4, https://en.wikipedia.org/wiki/Fingerprint_(computing) (accessed Apr. 3, 2018).
Wikipedia contributors, "Cloud Computing," Wikipedia, The Free Encyclopedia, pp. 1-20, https://en.wikipedia.org/wiki/Cloud_computing (accessed Apr. 3, 2018).
Jun. 27, 2019 (WO) International Search Report and Written Opinion—App PCT/US2019/022168.
Microsoft docs architecture center, "Caching," May 24, 2017, XP002792113, pp. 1-36, https://docs.microsoft.com/en-us/azure/architecture/best-practices/caching (retrieved on Jun. 13, 2019).
Apr. 27, 2021—(CN) Office Action—App 201980026717.4.
Apr. 22, 2021—(AU) Examination Report—App 2019248441.

\* cited by examiner

DATA CACHING FOR CLOUD SERVICES

CROSS-REFERENCE TO RELATED APPLICATIONS

This application is a continuation of and claims priority to U.S. patent application Ser. No. 15/944,107, filed Apr. 3, 2018, and entitled "DATA CACHING FOR CLOUD SERVICES," which is hereby incorporated by reference in its entirety.

FIELD

Aspects described herein generally relate to computer and network hardware and software. In particular, the present disclosure relates to methods and systems for caching data for resources using a shared cache in a cloud system.

BACKGROUND

Enterprises are increasingly adopting cloud computing services, as well as new approaches to data storage including object storage. Cloud computing services may provide various resources as a service to users. Data used for or by the resources may be stored in databases running on the cloud computing servers. When the data are needed for or by the resources, requests to obtain the data may be sent to the databases running on the cloud computing servers. As the number of users accessing the resources increases rapidly, architecture for handling a voluminous number of requests to obtain the data may be developed.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Examples described herein are directed towards a system, an apparatus, and/or computer readable media configured to perform a method for caching data for resources using a shared cache. The method may include receiving, from a user device and by a computing device, a request to access a resource. The computing device may determine an identifier associated with the resource and a data identifier indicating first data associated with the resource. The first data may be stored in the resource. The computing device may determine, based on information indicating a load of a configuration service, an operation mode. After determining that the operation mode comprises a high load operation mode, the computing device may send, to the shared cache, a request to determine whether second data associated with the resource is stored in the shared cache. The request to determine whether the second data associated with the resource is stored in the shared cache may comprise the identifier associated with the resource and the data identifier. The computing device may receive, from the shared cache, an indication of whether the second data associated with the resource is stored in the shared cache. The computing device may determine, based on the indication of whether the second data associated with the resource is stored in the shared cache, whether to send, to the configuration service, a request to obtain third data associated with the resource.

In some examples, the computing device may determine, based on the data identifier, whether the second data is different from the first data. After determining that the second data is different from the first data, the computing device may replace the first data with the second data. In some examples, the computing device may receive an indication that the second data corresponds to the first data. The computing device may launch the resource based on the first data.

In some examples, the second data may expire after an expiration period. After determining that the operation mode comprises the high load operation mode, the computing device may refresh the expiration period of the second data. In some examples, after determining that the second data is not stored in the shared cache, the computing device may send, to the configuration service, a request to obtain the third data. The computing device may receive, from the configuration service, the third data. The computing device may insert, to the shared cache, the third data.

In some examples, the computing device may receive a second request to access a second resource. After determining that a second operation mode comprises a low load operation mode, the computing device may send, to the configuration service, a request to obtain fourth data associated with the second resource. In some examples, the determining the operation mode may comprise determining the operation mode based on business hours of a business associated with a user of the user device.

In some examples, the computing device may receive, within a period of time, a plurality of requests to access a plurality of resources. The determining the operation mode may comprise determining the operation mode based on a number, of the plurality of requests, exceeding a threshold. In some examples, the shared cache may comprise an in-memory database. In some examples, the data identifier may comprise a fingerprint of the first data.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards caching data for resources using a shared cache. A user may request to access a resource for his or her various uses. Data associated with the resource may be stored in a configuration service, the resource, or the shared cache. The data stored in the configuration service may be modified. The data stored in the resource and in the shared cache may be updated based on the modified data in the configuration service. The data stored in the configuration service, the resource, or the shared cache may be used based on an operation mode.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
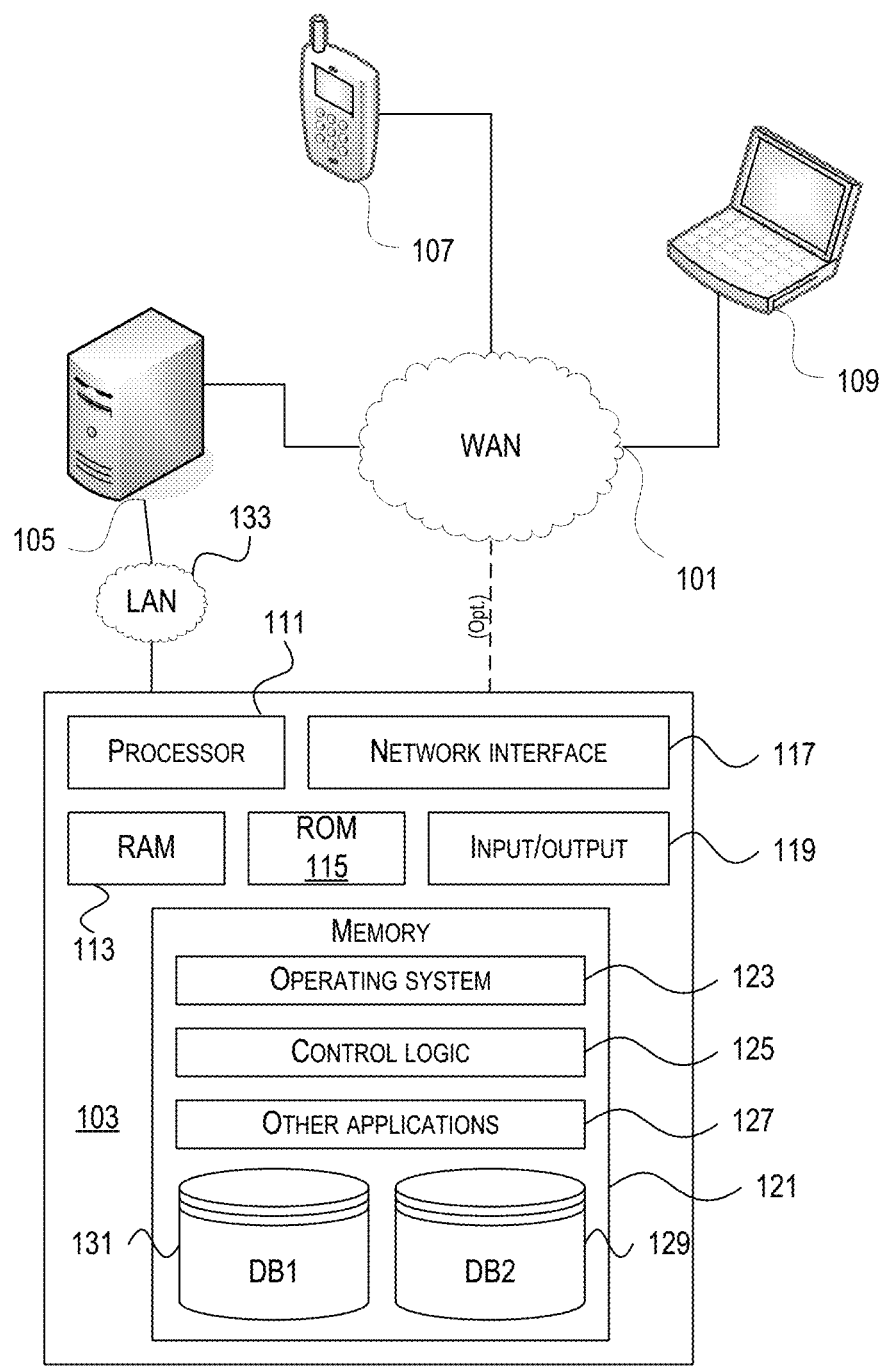
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
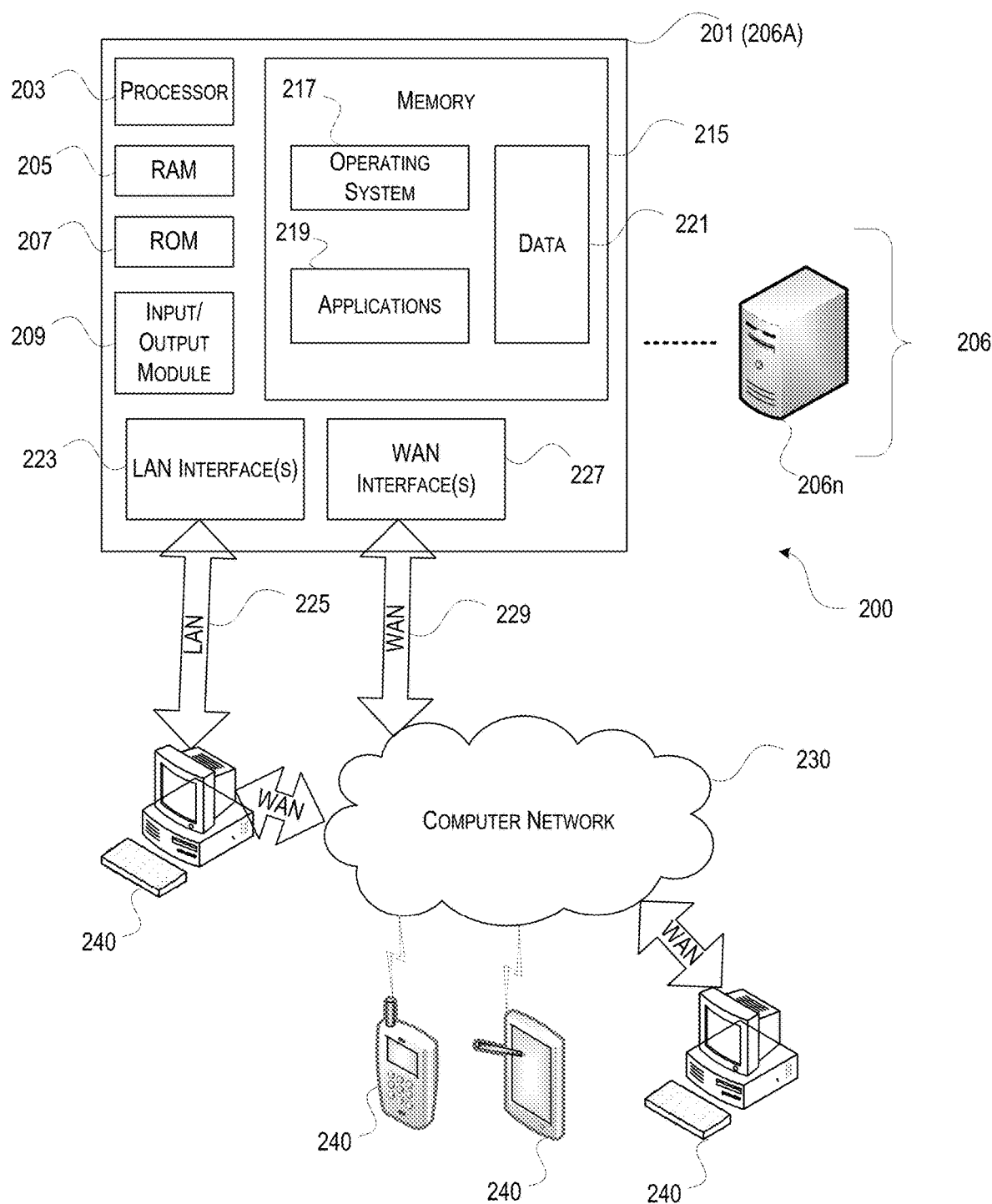
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
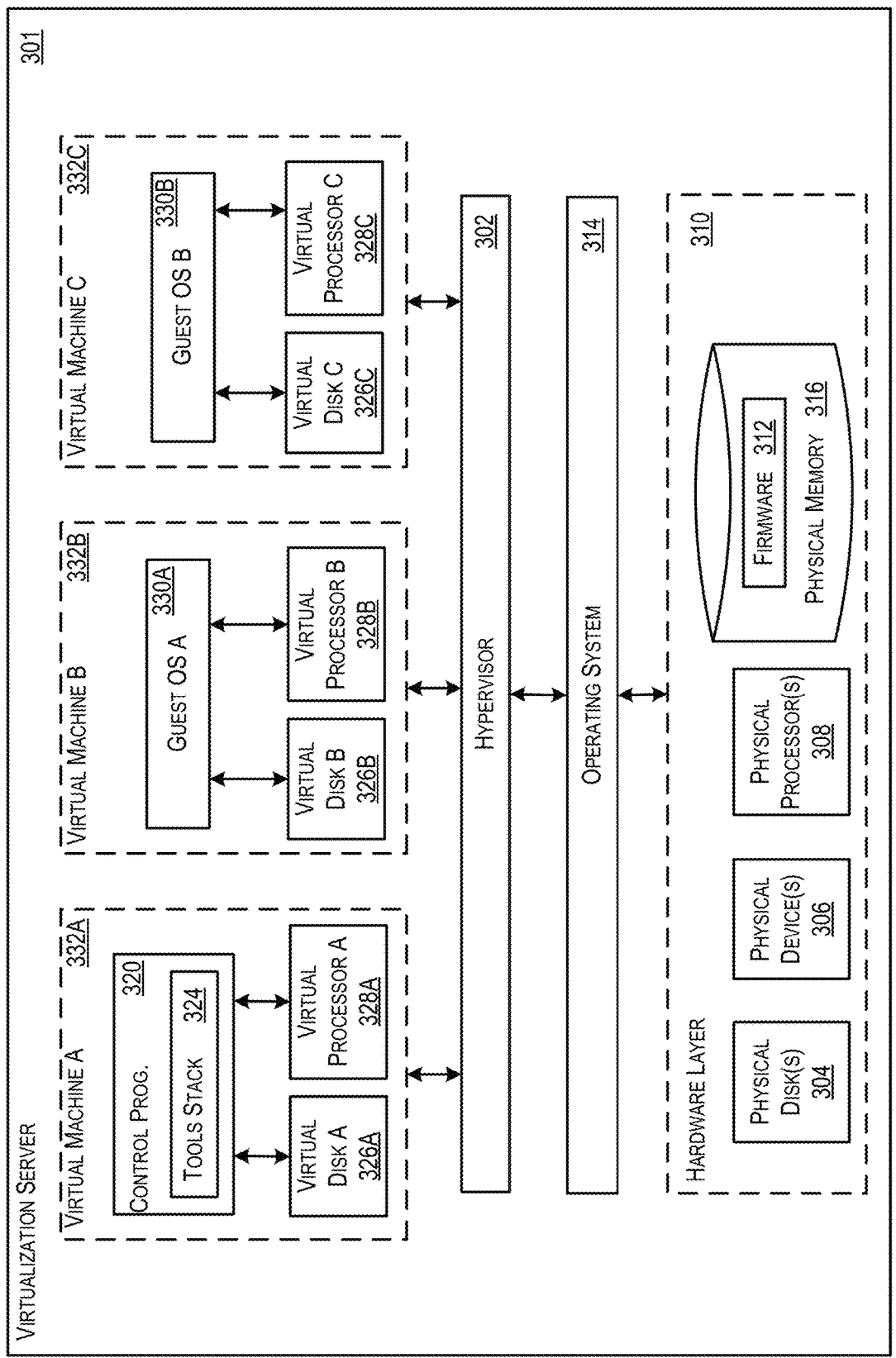
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
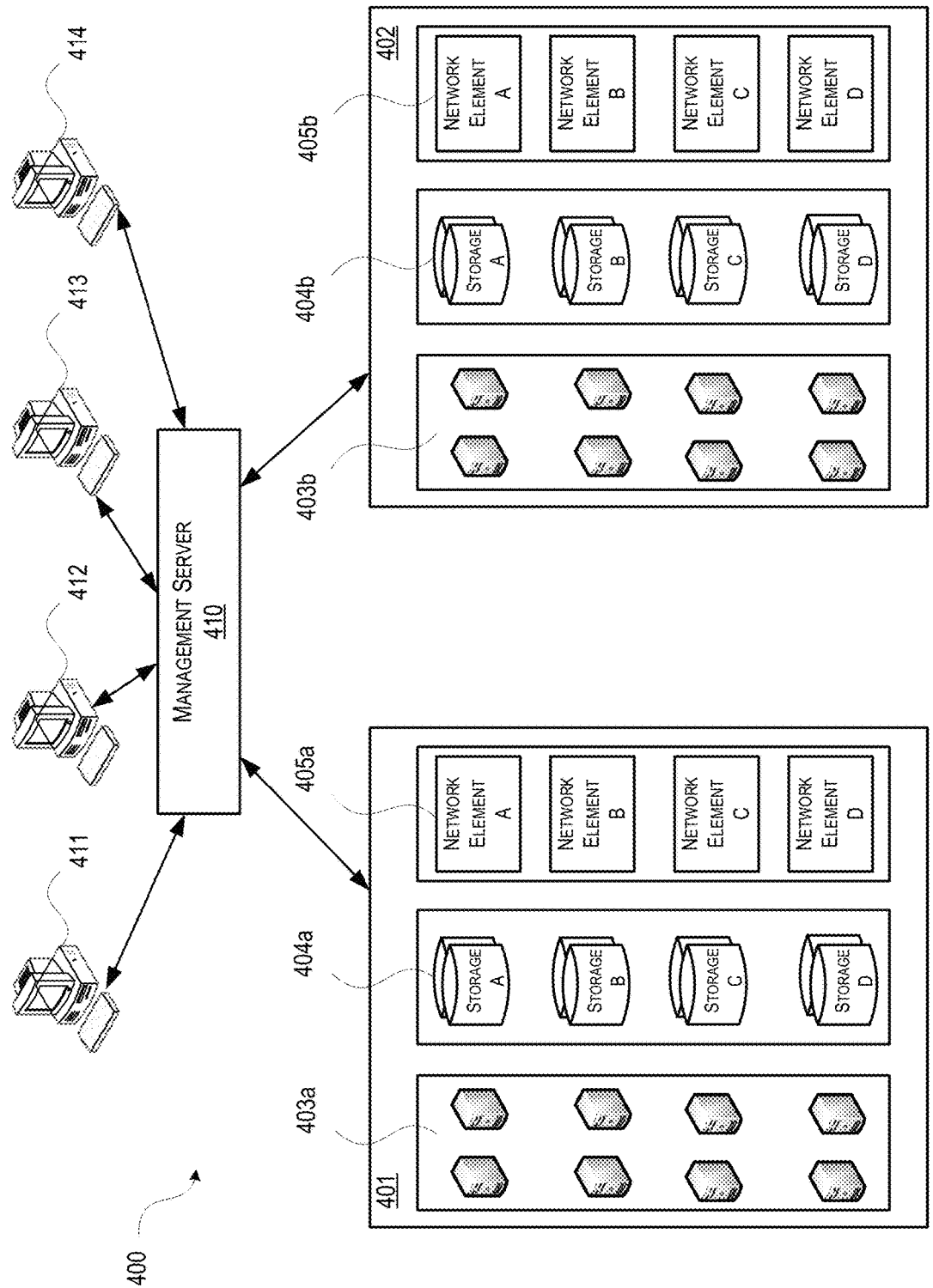
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Data Caching for Cloud Services

Figure 5:
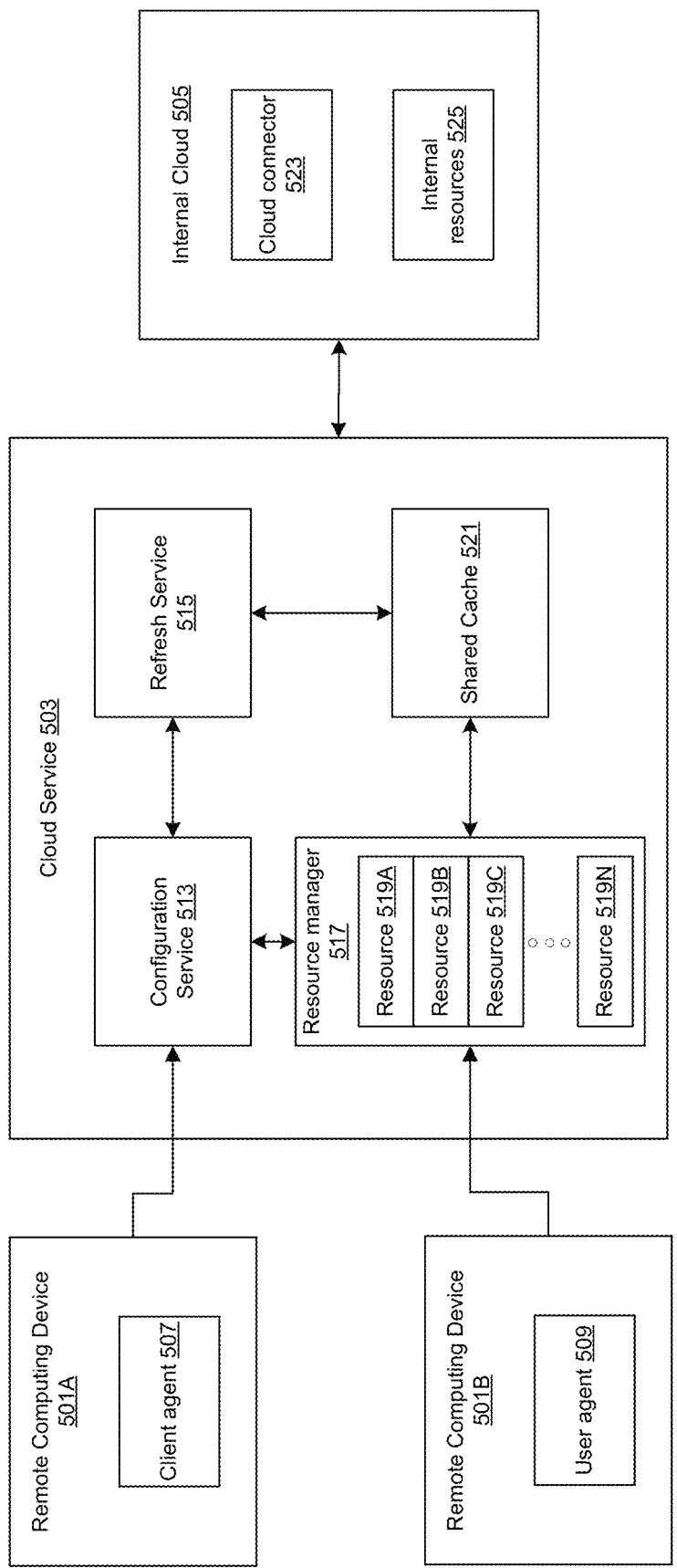
FIG. 5 is a schematic diagram showing an example system for caching data in a cloud system.

FIG. 5 is a schematic diagram showing an example system for caching data in a cloud system. The system may comprise one or more remote computing devices (e.g., remote computing devices 501A, 501B), a cloud service 503, and an internal cloud 505. The remote computing devices 501A, 501B, the cloud service 503, and the internal cloud 505 may communicate with each other via a network (e.g., the wide area network 101, the computer network 230, the Internet, or other networks).

The remote computing devices 501A, 501B may comprise, for example, the client computers 107, 109, the client devices 240, the client computers 411-414, or other computing devices. A client agent 507 may be implemented on the remote computing device 501A. A user agent 509 may be implemented on the remote computing device 501B.

The cloud service 503 may comprise processes implemented on, for example, the data server 103, the web server 105, the servers 206, the virtualization server 301, the zones 401-402, or other computing devices. The cloud service 503 may be, for example, a public cloud that is open for public use. The cloud service 503 may include a configuration service 513, a refresh service 515, a resource manager 517 (including one or more resources 519A-N), and a shared cache 521.

The components of the cloud service 503 may be implemented on one server or on multiple servers. For example, the components may be implemented on a server or a server cluster in a central datacenter. Additionally or alternatively, the components may be implemented on different servers located in different geographical regions. Additionally or alternatively, the configuration service 513 may be implemented on a server in a central datacenter located in one geographical region, and the resource manager 517 (including the resources 519A-N) may be implemented in multiple datacenters located in different geographical regions. The refresh service 515 and the shared cache 521 may be implemented in each of the different geographical regions, closer to each instance of the resource manager 517.

The internal cloud 505 may comprise processes running on, for example, the data server 103, the web server 105, the servers 206, the virtualization server 301, the zones 401-402, or other computing devices. The internal cloud 505 may be, for example, a private cloud that is operated for one or more organizations. The internal cloud 505 may be, for example, located on the organization premises, closer to end users.

The internal cloud 505 may comprise a cloud connector 523 and internal resources 525. The cloud connector 523 may allow communications between the cloud service 503 and the internal resources 525. The internal resources 525 may comprise, for example, documents, files, applications, desktops, data (e.g., private data), etc. The cloud service 503, such as via the resources 519A-N, may access the internal resources 525 through the cloud connector 523.

The system may provide one or more of the resources 519A-N as a service to individual users. An individual user may be, for example, a natural person or a legal entity. Additionally or alternatively, the system may provide the resources 519A-N as a service to user groups. A user group may include a number of users. A user group may be, for example, an organization (e.g., a business organization, a government organization, etc.), or a portion of the organization. A user group may be, for example, a customer of the cloud service 503.

A user group may control, use, or manage a number of resources from the resources 519A-N. An administrator of the user group (or other persons or entities associated with the user group) may manage the user group's resources. For example, the administrator may authorize a user in the user group to access the user group's resources. The administrator may associate a resource of the user group's resources with the user (e.g., allowing the user to access the resource by entering a username and password).

The administrator may manage the user group's resources through the client agent 507. The client agent 507 may comprise, for example, a web browser, a mobile application, a thin client, a terminal emulator, etc. The client agent 507 may communicate with the cloud service 503. The client agent 507 may provide a user interface. Through the user interface, the administrator may manage the user group's resources. For example, the administrator may monitor the running status of the user group's resources (e.g., monitor RAM usage rates, disk drive usage rates, etc.).

The resources 519A-N may include, for example, virtual machines (e.g., the virtual machines 332), servers (e.g., the host servers 403), storage (e.g., the storage resources 404), network (e.g., the network resources 405), databases, web servers, emails, virtual desktops, games, applications, or other resources.

A user may access a resource of the resources 519A-N through the user agent 509. The user agent 509 may comprise, for example, a web browser, a mobile application, a thin client, a terminal emulator, etc. The user agent 509 may be used to access one or more of the resources 519A-N. The user agent 509 may provide a user interface. Through the user interface, the user may use the resource (e.g., issue commands to the resource). For example, the user may start a virtual machine, launch an application, or send an email through the user interface.

The resource manager 517 may comprise, for example, a hypervisor (e.g., the hypervisor 302), StoreFront as a Service (SFaaS), or other processes that may control the resources 519A-N. The resource manager 517 may assign hardware, software, network, or peripheral devices to a resource according to configuration data for the resource.

The resource manager 517 may configure the resources 519A-N to be same or different according to their respective same or different configuration data. Additionally or alternatively, the resource manager 517 may comprise a workspace store (e.g., an enterprise application store that may provide an interface for users to access the resources 519A-N) powered by a cluster of servers. The cluster of servers may sit behind a load balancer. The load balancer may receive, from the user agent 509, a request to access a resource of the resources 519A-N. Based on load balancing algorithms, the load balancer may route the request to a server of the cluster of servers. The server of the cluster of servers may receive the request and initiate configuring the resource (e.g., according to the configuration data for the resource). Different requests to access the resources 519A-N may be routed to different servers of the cluster of servers based on the load balancing algorithms.

The configuration data may comprise, for example, information that specifies the configuration of a resource. For example, the configuration data for a virtual machine may include the virtual machine's guest operating system type and version, Central Processing Unit (CPU) capacity, Random Access Memory (RAM) size, disk drive, network adapter information, or other settings. Additionally or alternatively, the configuration data may specify whether a resource associated with a user or a user agent associated with a user is allowed to access all or a portion of the internal resources 525 or other cloud resources. The configuration data may specify the manners (e.g., secured or unsecured connection, connection bandwidth, communication protocol, etc.) in which the resource or the user agent may access the internal resources 525 or other cloud resources. Additionally or alternatively, the configuration data may specify the design (e.g., colors, symbols, input controls, navigational components, informational components, etc.) of the user interface provided by the user agent 509. The configuration data may be other types of data (e.g., data used for or by the resources).

The configuration data for the resources 519A-N may be stored in the configuration service 513. For example, the configuration service 513 may maintain a database storing the configuration data for the resources 519A-N. The administrator of a user group may modify the configuration data stored in the database (e.g., through the client agent 507 connected to the configuration service 513). The database may comprise any type of database systems (e.g., ORACLE Database, MySQL, MICROSOFT SQL Server, IBM DB2, etc.). The following shows an example database table storing configuration data.

| User Group | Configuration Data |
|---|---|
| GroupA | RAM size 2 GB, disk 10 GB, guest operating system Windows |
| GroupB | RAM size 1 GB, disk 20 GB, guest operating system Linux |
| GroupC | RAM size 1 GB, disk 20 GB, guest operating system Macintosh |

In the table, the user groups may be identified by group identifiers (e.g., GroupA, GroupB, GroupC, etc.). Each user group may have corresponding configuration data. The configuration data for a user group may be used to configure the resources of the user group. For example, a resource of the user group GroupA may be configured according to the configuration data "RAM size 2 GB, disk 10 GB, guest operating system Windows."

A user group may be divided into several subgroups, and each subgroup may have its own configuration data, which may be same as or different from the configuration data for another subgroup. The configuration data for a subgroup may be used to configure the resources associated with the subgroup. Additionally or alternatively, each resource of the resources of a user group may have its own specific configuration data. The database may store records of resource identifiers and corresponding configuration data. The resource identifier may identify a specific resource. The corresponding configuration data may be used to configure that specific resource.

The configuration data stored in the configuration service 513 may be used by or for the resources 519A-N. For example, when a user requests to access a resource, the resource manager 517 may send, to the configuration service 513, a request to obtain configuration data for the resource. The request may include the group identifier of the user. The configuration service 513 may search the configuration data database to identify the configuration data corresponding to the group identifier. The configuration service 513 may send the configuration data to the resource manager 517. The resource manager 517 may configure the resource according to the received configuration data.

When the number of requests to obtain configuration data stored in the configuration service 513 becomes large (e.g., millions of requests), there might be a scalability challenge for the configuration service 513. For example, the configuration service 513 might not be able to be economically configured to process the large number of requests to obtain configuration data.

Storing configuration data in the resources 519A-N may help alleviate the scalability challenge for the configuration service 513. For example, a resource may be assigned storage by the resource manager 517. The storage may be local to the resource. The storage may be, for example, a cache, memory, disk, virtual storage, or other types of storage. Configuration data for the resource may be stored in the resource's local storage, and may be read and used by the resource manager 517 to configure the resource.

The configuration data stored in the resources 519A-N may become out of date, or may become inconsistent among the resources 519A-N, if the resource manager 517 does not periodically query the configuration service 513 to get up-to-date configuration data stored therein, and update the configuration data stored in the resources 519A-N. For example, the configuration data stored in a resource may be copied from the configuration service 513 when the resource was initially set up. At some later time, the configuration data may be needed again for configuring the resource. In the interim, the administrator may change the configuration data for the resource, and that change may be made to the configuration data stored in the configuration service 513. If the resource manager 517 does not query the configuration service 513 (e.g., periodically), the configuration data stored in the resource may become different from the up-to-date configuration data stored in the configuration service 513.

The shared cache 521 may help alleviate the scalability challenge for the configuration service 513, and help keep the configuration data stored in the resources up to date. The shared cache 521 may comprise, for example, a cloud database, or a high availability database. For example, the shared cache 521 may comprise an in-memory database that primarily relies on main memory (e.g., RAM), as opposed to disk storage, for data storage. Additionally or alternatively, the shared cache 521 may be a REDIS database.

The configuration data for the resources 519A-N may be stored in the shared cache 521. For example, when a user requests access to a resource, the resource manager 517 may send a request to the shared cache 521 to obtain the configuration data stored in the shared cache 521. The shared cache 521 may maintain a database table similar to the database table in the configuration service 513. For example, the database table in the shared cache 521 may include data records of group identifiers and corresponding configuration data. The shared cache 521 may use a group identifier as the key to search for the corresponding configuration data. Additionally or alternatively, the data records may include subgroup identifiers and corresponding configuration data. The shared cache 521 may identify configuration data based on searching a subgroup identifier. Additionally or alternatively, the data records may include resource identifiers and corresponding configuration data. The shared cache 521 may identify configuration data based on searching a resource identifier.

The configuration data stored in the shared cache may expire after an expiration period (e.g., 5 minutes). The refresh service 515 may refresh the expiration period of the data to keep it stored in the shared cache 521 for a longer period of time. The refresh service 515 may update the configuration data stored in the shared cache 521. For example, the refresh service 515 may periodically check whether an administrator changed the configuration data, and may update the configuration data stored in the shared cache 521 according to the changed configuration data. Additionally or alternatively, when an administrator changes the configuration data stored in the configuration service 513, the configuration service 513 may notify the refresh service 515 of the change. The refresh service 515 may receive the notification and proceed to update the configuration data stored in the shared cache 521.

If the shared cache 521 comprises an in-memory, high availability database, the shared cache 521 may be more expensive or energy consuming than other types of caches. It may be advantageous to determine the time when using the shared cache 521 may be preferred, such as when the number of requests to access the resources 519A-N or the number of requests to obtain configuration data is large. The refresh service 515 may determine, based on information indicating the number of user access events, an operation mode. Based on the operation mode, the system may determine whether to use the configuration service 513 or the shared cache 521 as the source to obtain configuration data. Methods for caching data using the shared cache 521 are further discussed in connection with FIGS. 6-8.

Requests to obtain data (e.g., the requests to obtain configuration data sent by the resource manager 517 to the configuration service 513, or to the shared cache 521) may involve communicating data identifiers, instead of the data itself. The data identifiers may uniquely identify the data, but may have a smaller file size than the data. This may help reduce network traffic. The actual data might not be sent when a comparison of two data identifiers shows that two instances of the data associated with the two data identifiers are same.

Figure 6:
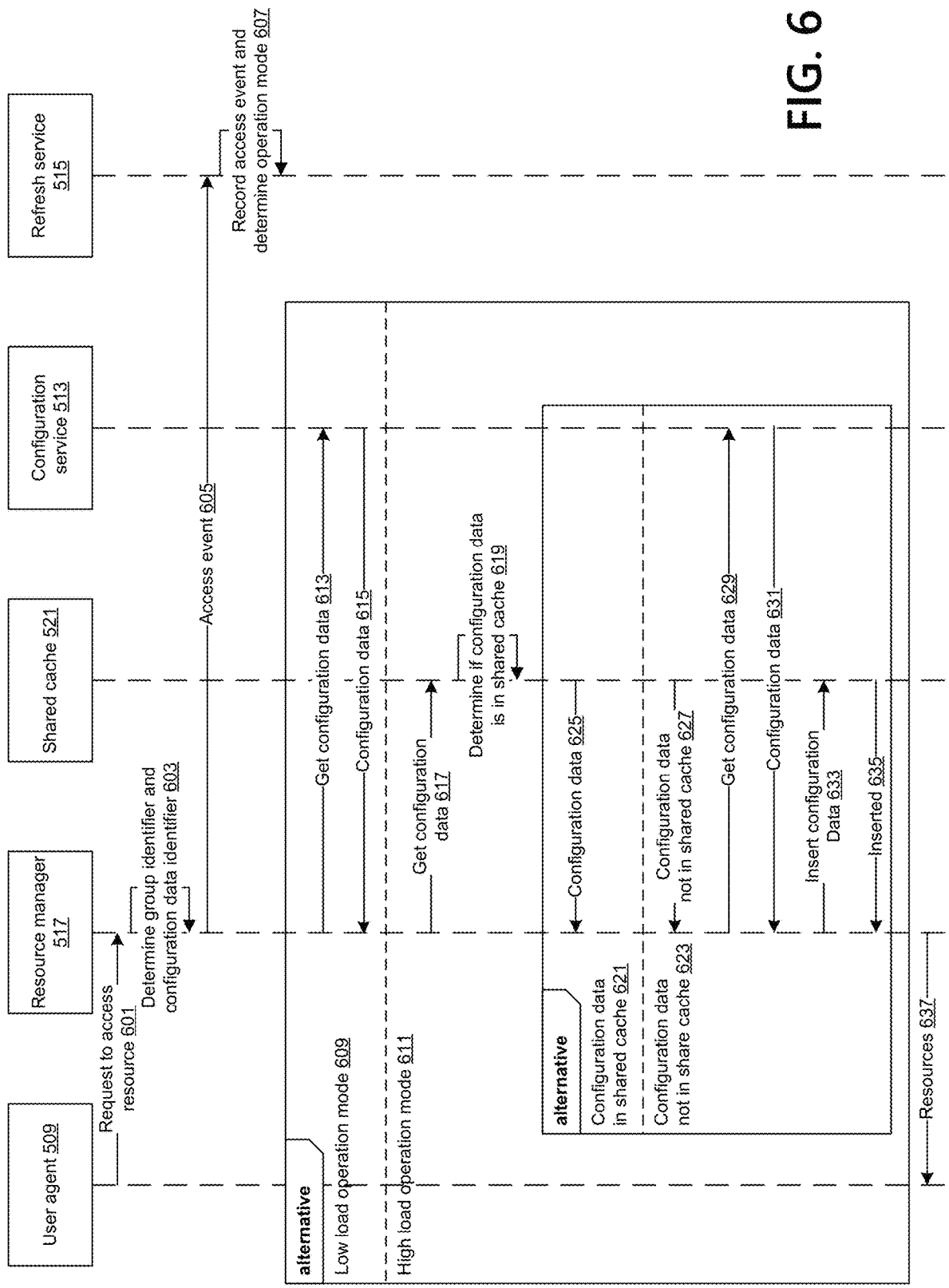
FIG. 6 is a flowchart showing an example method for caching data using a shared cache.

FIG. 6 is a flowchart showing an example method for caching data using a shared cache. The method may be performed by, for example, the system discussed in connection with FIG. 5. The method is discussed below and in FIG. 6 for configuration data. However, the method may be applicable to any types of data (e.g., data used for or by the resources).

In step 601, the user agent 509 may send, to the resource manager 517, a request to access a resource of the resources 519A-N. A user of the remote computing device 501B may input, via the user agent 509, a command to access the resource. For example, the user may enter in a web browser a Uniform Resource Locator (URL) that points to the cloud service 503, and the web browser may show a webpage including a number of icons. The user may select, via an input device (e.g., a touch screen, keyboard, mouse, gesture, etc.) of the remote computing device 501B, an icon for the resource. The user agent 509 implemented on the remote computing device 501B may initiate communication with the resource manager 517.

The resource manager 517 may receive the request to access the resource from the user agent 509. The resource manager 517 may initiate processes to configure the resource, such as obtaining the configuration data for the resource. In step 603, the resource manager 517 may determine the group identifier of the user (e.g., based on the user's request to access the resource). For example, the URL that the user entered in the web browser that links to the cloud service 503 may indicate the group identifier of the user (e.g., a URL "groupA.cloudservice.com" indicates the group identifier is "groupA"). The group identifier included in the URL may be included in the request to access the resource.

Additionally or alternatively, the resource manager 517 may determine the identity of the user (e.g., based on the user's request to access the resource). For example, the user may enter, in a web browser, a URL that links to the cloud service 503. The webpage associated with the URL may prompt the user to enter his or her username and password to authenticate himself or herself. The username and password may be included in the request to access the resource. The resource manager 517 may determine the user's identity based on the username and password. The resource manager 517 may identify the resource associated with the user based on the user's identity.

In step 603, the resource manager 517 may also determine a configuration data identifier for the configuration data stored in the resource. The configuration data identifier may be used to determine whether two instances of the configuration data are same. The resource manager 517 may retrieve the configuration data stored in the resource, and generate the configuration data identifier based on the retrieved configuration data.

The configuration data identifier may be, for example, a successive combination of all or a portion of the configuration data. For example, if the configuration data includes data fields RAM size, disk size, and guest operating system, and the values of those data fields are respectively 2 GB, 10 GB, and Operating_System_1, the configuration data identifier may be 2 GB 10 GB Operating_System_1.

Additionally or alternatively, the configuration data identifier may be generated by a fingerprinting algorithm. The fingerprinting algorithm may map a large set of data to a shorter bit string (e.g., the fingerprint) that uniquely identifies the original set of data. The input of the fingerprinting algorithm may comprise the configuration data or a portion thereof. The output of the fingerprinting algorithm may comprise the configuration data identifier.

Additionally or alternatively, the configuration data identifier may be generated by a hash function (e.g., hashing the configuration data to generate the configuration data identifier). Additionally or alternatively, the configuration data identifier may comprise an entity tag (ETag), and may be generated by an ETag generation algorithm (e.g., a collision-resistant hash function).

Additionally or alternatively, the configuration data identifier may be generated based on a last modification timestamp of the configuration data. For example, when an administrator modifies the configuration data in the configuration service 513, the time of making the modification (e.g., a timestamp) may be recorded (e.g., stored in connection with the configuration data). The timestamp may indicate a version of the configuration data. Additionally or alternatively, the configuration data identifier may be generated by applying a fingerprinting algorithm or hash function to the last modification timestamp.

As the configuration data identifier may be transmitted via the network, using the fingerprinting or hashing algorithms to generate the configuration data identifier may help reduce traffic, and save bandwidth of the network.

In step 605, the resource manager 517 may send, to the refresh service 515, a message indicating an access event. The message indicating the access event may indicate, to the refresh service 515, that a user is requesting to access the resource and the configuration data for the resource is desired. The access event message may include the group identifier of the user and/or a timestamp of sending the message.

In step 607, the refresh service 515 may receive the message and may record the access event. The message may be used by the refresh service 515 to determine an operation mode (e.g., high load operation mode or low load operation mode). The operation mode may indicate whether the configuration service 513 or the shared cache 521 is to be the source to obtain configuration data. The refresh service 515 may aggregate access events generated as a result of different user requests to access resources. The refresh service 515 may determine the operation mode based on the aggregated access events.

A user group specific operation mode may be determined. The refresh service 515 may aggregate access events associated with a particular user group, and determine the quantity of access events associated with the user group generated within a time window (e.g., 10 minutes). For example, if a user requesting to access a resource is a member of user group A, the access event generated as a result of the user's request to access the resource may be considered by the refresh service 515 to determine the operation mode for user group A. If another user requesting access to a resource is a member of user group B, the access event generated as a result of the other user's request to access the resource might not be considered by the refresh service 515 to determine the operation mode for user group A.

If the number of access events associated with the user group within the time window exceeds a threshold, the refresh service 515 may set the operation mode for the user group to be the high load operation mode. Otherwise, the refresh service 515 may set the operation mode for the user group to be the low load operation mode. The threshold may be determined based on the capacity of the configuration service 513 to process requests to obtain configuration data. For example, if the configuration service 513 may handle N requests within the time window, and the cloud service 503 has M user groups, the threshold may be set to be N/M (N divided by M). Additionally or alternatively, if the configuration service 513 may handle N requests within the time window, the cloud service 503 has M users, and the particular user group includes L users, the threshold may be set to be N*L/M (N multiply L divided by M).

Additionally or alternatively, the refresh service 515 may determine the operation mode for a user group based on business hours associated with the user group. For example, the refresh service 515 may determine that the operation mode is the high load operation mode during standard business hours in the region in which the user group is located (e.g., the user group's primary location). For example, if the user group is in the United States and the standard business hours in the United States is 9 am to 5 pm, the system may determine that the operation mode for the user group is the high load operation mode from 9 am to 5 pm.

Additionally or alternatively, the refresh service 515 may determine a common operation mode for the user groups. The refresh service 515 may aggregate received access events associated with the user groups, and determine the quantity of access events generated within a time window (e.g., 10 minutes). If the number of access events within the time window exceeds a threshold, the refresh service 515 may set the common operation mode to be the high load operation mode. Otherwise, the refresh service 515 may set the common operation mode to be the low load operation mode. The threshold may be determined based on the capacity of the configuration service 513. For example, if the configuration service 513 is able to process 1 million requests to obtain configuration data during the time window, the threshold may be set as 1 million.

Historical data may be used to predict the time period when there may be high volume of requests to obtain configuration data. For example, the refresh service 515 may consider access events recorded for the last day, month, or year. If the historical data shows that the number of access events from 10 am to 11 am on Monday exceeds a threshold, the refresh service 515 may determine that the operation mode during the 10 am to 11 am time period on next Monday may be the high load operation mode.

The refresh service 515 may inform the configuration service 513, the resource manager 517, the shared cache 521, or other components, of the determined operation mode. For example, when the operation mode changes from one state to another state, the refresh service 515 may send a message indicating the change of the operation mode.

The resource manager 517 may receive (e.g., from the refresh service 515) the operation modes for one or more user groups. The resource manager 517 may determine the operation mode for the user's request to access the resource. For example, the operation mode for the request to access the resource may be the operation mode for the user group in which the user sending the request is a member.

Based on the operation mode for the user's request to access the resource, the method may proceed to two alternative sets of steps. If the resource manager 517 determines 609 that the operation mode for the user's request to access the resource comprises the low load operation mode, the method may proceed to step 613. In step 613, the resource manager 517 may send, to the configuration service 513, a request to obtain configuration data for the resource. The request may include the group identifier of the user. The configuration service 513 may receive the request, and, based on the group identifier, find the corresponding configuration data for the resource. In step 615, the configuration service 513 may send the found configuration data to the resource manager 517. The resource manager 517 may receive the configuration data from the configuration service 513. The resource manager 517 may replace the configuration data stored in the resource with the received configuration data. The resource manager 517 may configure the resource based on the received configuration data.

Additionally or alternatively, the request to obtain configuration data sent by the resource manager 517 in step 613 may include the configuration data identifier for the configuration data stored in the resource. The configuration service 513 may generate a second configuration data identifier based on the configuration data for the resource stored in the configuration service 513. The configuration service 513 may compare the two configuration data identifiers. If the configuration service 513 determines that they are different, the configuration service 513 may send, to the resource manager 517, a message indicating that the configuration data stored in the resource is out of date. The message may include the configuration data stored in the configuration service 513. Otherwise, the configuration service 513 may send, to the resource manager 517, a message indicating that the configuration data stored in the resource is up to date, and that the resource manager 517 may use the configuration data stored in the resource to configure the resource.

If the resource manager 517 determines 611 that the operation mode for the user's request to access the resource comprises the high load operation mode, the method may proceed to step 617. In step 617, the resource manager 517 may send, to the shared cache 521, a request to get configuration data for the resource. The request may include the group identifier of the user. The shared cache 521 may receive the request. In step 619, the shared cache 521 may determine, based on the group identifier, whether the corresponding configuration data for the resource is stored in the shared cache 521.

Based on whether the configuration data for the resource is stored in the shared cache 521, the method may proceed to two alternative sets of steps. If the shared cache 521 determines 621 that it stores the configuration data for the resource, the method may proceed to step 625. In step 625, the shared cache 521 may send, to the resource manager 517, the configuration data for the resource stored in the shared cache 521. The resource manager 517 may receive the configuration data from the shared cache 521. The resource manager 517 may replace the configuration data stored in the resource with the received configuration data. The resource manager 517 may use the received configuration data to configure the resource.

Additionally or alternatively, the request to obtain configuration data sent by the resource manager 517 in step 617 may include the configuration data identifier for the configuration data stored in the resource. The shared cache 521 may generate a second configuration data identifier based on the configuration data for the resource stored in the shared cache 521. The shared cache 521 may compare the two configuration data identifiers. If the shared cache 521 determines that they are different, the configuration service 513 may send, to the resource manager 517, a message indicating that the configuration data stored in the resource is different (e.g., out of date). The message may include the configuration data stored in the shared cache 521. Otherwise, the shared cache 521 may send, to the resource manager 517, a message indicating that the configuration data stored in the resource is up to date, and that the resource manager 517 may use the configuration data stored in the resource to configure the resource.

If the shared cache 521 determines 623 that it does not store the configuration data for the resource, the method may proceed to step 627. In step 627, the shared cache 521 may send, to the resource manager 517, a response indicating that the configuration data for the resource is not stored in the shared cache 521. The resource manager 517 may receive the response.

In step 629, the resource manager 517 may send, to the configuration service 513, a request to obtain configuration data for the service. The configuration service 513 may respond to the request in step 629 in a manner similar to step 613 described above. In step 631, the configuration service 513 may send the configuration data to the resource manager 517, in a manner similar to step 615 described above. As explained above, configuration data identifier(s) for the configuration data stored in the resource may be used to save bandwidth in the communication between the resource manager 517 and the configuration service 513 in steps 629, 631.

The resource manager 517 may receive the configuration data for the resource from the configuration service 513, and may configure the resource according to the received configuration data. The resource manager 517 may replace the configuration data stored in the resource with the received configuration data. In step 633, the resource manager 517 may send, to the shared cache 521, a message to insert, to the shared cache 521, the configuration data the resource manager 517 received from the configuration service 513 (e.g., in step 631). Additionally or alternatively, if the configuration service 513 in step 631 indicates that the configuration data stored in the resource is up to date, the resource manager 517, in step 633, may send, to the shared cache 521, a message to insert, to the shared cache 521, the configuration data stored in the resource.

The shared cache 521 may insert the received configuration data as a new record in its database table. If afterwards the shared cache 521 receives a request to obtain configuration data for the same resource or for a resource associated with the same user group, the shared cache 521 may return the configuration data based on the new record.

Additionally or alternatively, when the operation mode for a user group changes from the low load operation mode to the high load operation mode, the system may identify, in the configuration service 513, configuration data associated with the user group, and insert the identified configuration data to the shared cache 521.

In step 635, the shared cache 521 may send, to the resource manager 517, a response indicating that the configuration data has been inserted to the shared cache 521. In step 637, the resource manager 517 may make the configured resource available to the user through the user agent 509.

Figure 7:
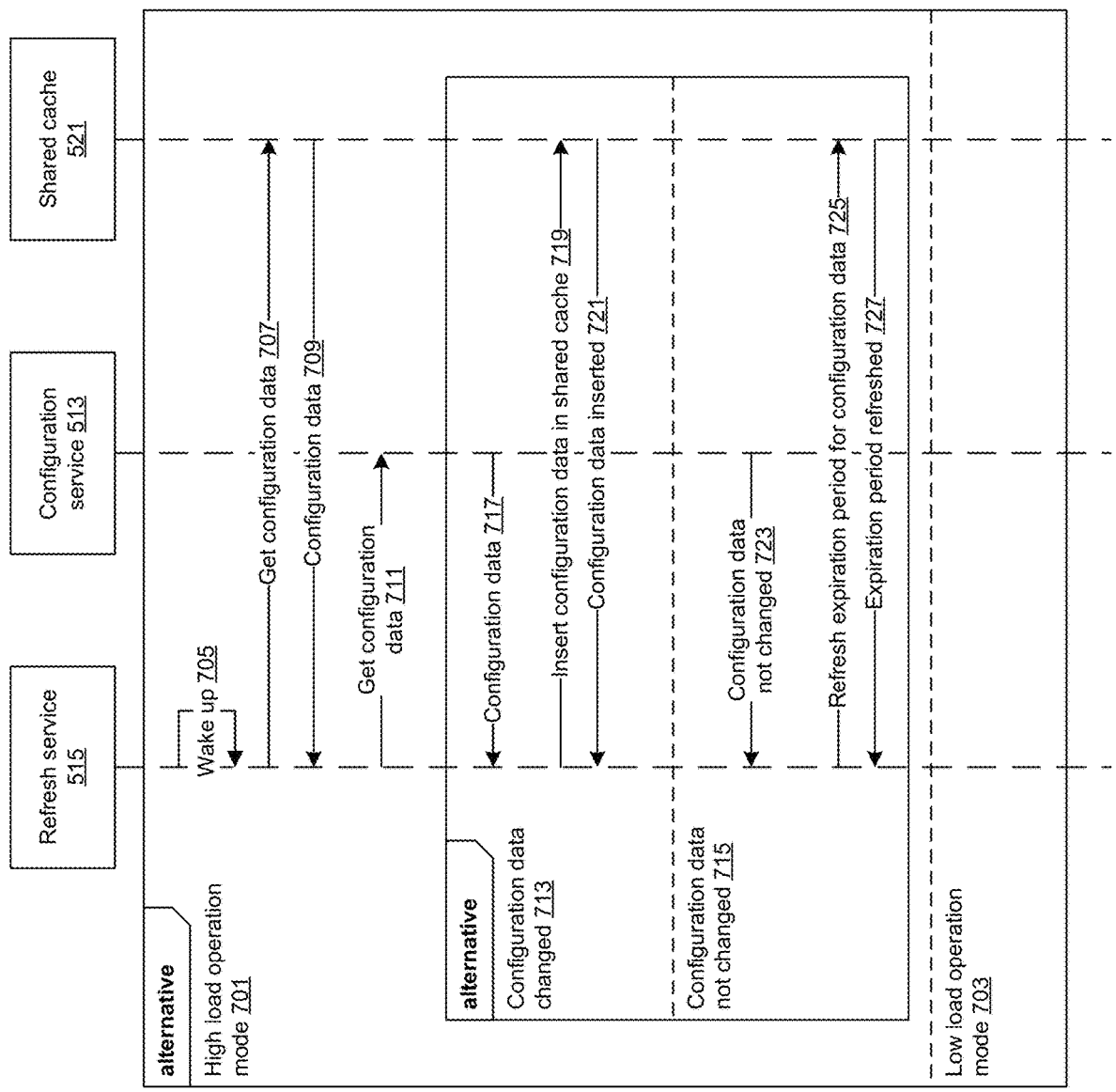
FIG. 7 is a flowchart showing an example method for updating or refreshing data stored in a shared cache.

FIG. 7 is a flowchart showing an example method for updating or refreshing data stored in a shared cache. The method is discussed below and in FIG. 7 for configuration data. However, the method may be applicable to any types of data (e.g., data used for or by the resources). The method may be performed for each record of data stored in the shared cache 521.

Based on the operation mode for a user group, the method may proceed to two alternative sets of steps. If the system determines 703 that the operation mode for the user group is the low load operation mode, the method might not perform any steps to update or refresh configuration data for the user group stored in the shared cache 521. For example, if configuration data for the user group is stored in the shared cache 521, and the operation mode for the user group comprises the low load operation mode, the system may allow the configuration data to expire after the expiration period.

If the system determines 701 that the operation mode for a user group is the high load operation mode, the method may proceed to step 705. In step 705, the refresh service 515 may wake up to initiate processes to keep the configuration data stored in the shared cache 521 during the high load operation mode, and to maintain the configuration data stored in the shared cache 521 up to date. The refresh service 515 may wake up periodically. For example, the refresh service 515 may wake up after a time period that is the same as the expiration period of the configuration data. Additionally or alternatively, the refresh service 515 may wake up after a time period that is different from the expiration period of the configuration data.

In step 707, the refresh service 515 may send, to the shared cache 521, a request to get configuration data associated with the user group. The request may include the group identifier. The shared cache 521 may receive the request, and find the configuration data corresponding to the group identifier. In step 709, the shared cache 521 may send, to the refresh service 515, a response indicating the configuration data associated with the user group. The refresh service 515 may receive the response, and may extract the configuration data from the response. The refresh service 515 may generate a configuration data identifier based on the extracted configuration data. Additionally or alternatively, to reduce the amount of data being transmitted, the refresh service 515 may in step 707 send, to the shared cache 521, a request to obtain a configuration data identifier for configuration data associated with the user group. After receiving the request, the shared cache 521 may find the configuration data corresponding to the user group, and may generate a configuration data identifier based on the found configuration data. The shared cache 521 may send the generated configuration data identifier to the refresh service 515.

In step 711, the refresh service 515 may send, to the configuration service 513, a request to obtain the configuration data for the user group stored in the configuration service 513. At some point in time, the administrator of the user group may modify, through the client agent 507, the configuration data for the user group. The change may be reflected in the configuration data stored in the configuration service 513, but not in the configuration data stored in the shared cache 521.

The request to obtain configuration data may include the group identifier of the user group, and the configuration data identifier that the refresh service 515 generated or received from the shared cache 521. The configuration service 513 may receive the request. The configuration service 513 may search its database to find the configuration data associated with the group identifier. The configuration service 513 may generate a second configuration data identifier based on the found configuration data. The configuration service 513 may compare the received configuration data identifier and the second configuration data identifier to see if they are different. If they are different, the configuration service 513 may determine that the configuration data stored in the configuration service 513 has been modified by the administrator, and that the configuration data stored in the shared cache 521 is out of date. Otherwise, the configuration service 513 may determine that the configuration data stored in the configuration service 513 has not been modified by the administrator, and the configuration data stored in the shared cache 521 is up to date.

Based on whether the configuration data stored in the configuration service 513 has been changed by the administrator, the method may proceed to two alternative sets of steps. If the configuration service 513 determines 713 that the configuration data stored therein has been changed, the method may proceed to step 717. In step 717, the configuration service 513 may send, to the refresh service 515, a response indicating that the configuration data stored in the configuration service 513 has been changed. The response may include the configuration data associated with the user group stored in the configuration service 513. The refresh service 515 may receive the response, and may extract the configuration data.

In step 719, the refresh service 515 may send, to the shared cache 521, a request to insert the extracted configuration data into the shared cache 521. The shared cache 521 may receive the request and may insert the configuration data as a new record in the shared cache 521. In step 721, the shared cache 521 may send, to the configuration service 513, a response indicating that the configuration data has been inserted into the shared cache 521.

If the configuration service 513 determines 715 that the configuration data stored therein has not been changed, the method may proceed to step 723. In step 723, the configuration service 513 may send, to the refresh service 515, a response indicating that the configuration data stored in the configuration service 513 has not been changed. The refresh service 515 may receive the response.

In step 725, the refresh service 515 may send, to the shared cache 521, a request to refresh the expiration period for the configuration data. The shared cache 521 may receive the request, and may refresh the expiration period for the configuration data. In step 727, the shared cache 521 may send, to the refresh service 515, a response indicating that the expiration period for the configuration data has been refreshed.

Figure 8:
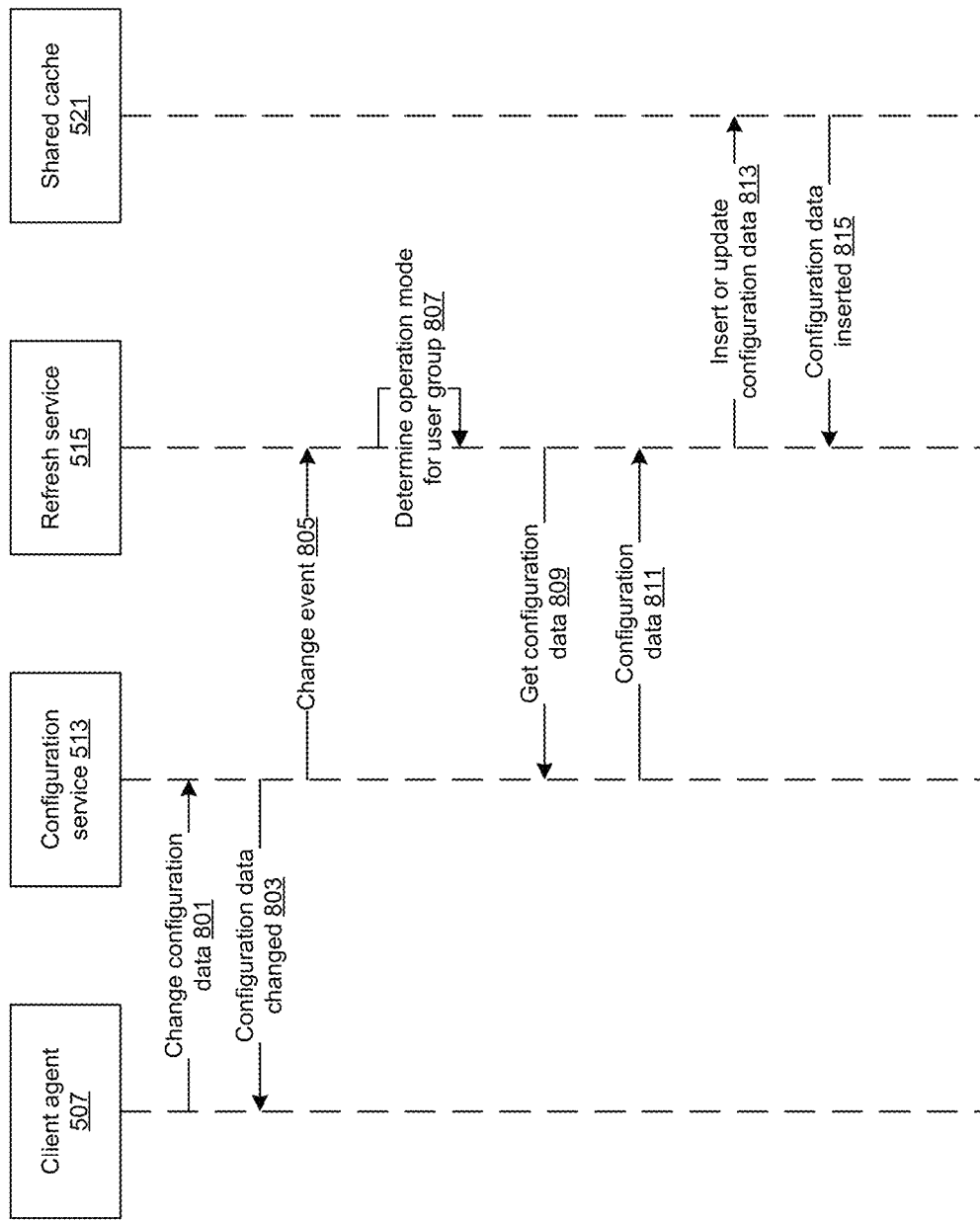
FIG. 8 is a flowchart showing an example method for updating data stored in a shared cache based on data change events.

FIG. 8 is a flowchart showing an example method for updating data stored in a shared cache based on data change events. The method is discussed below and in FIG. 8 for configuration data. However, the method may be applicable to any types of data (e.g., data used for or by the resources).

In step 801, the client agent 507 may send, to the configuration service 513, a request to change configuration data associated with a user group. For example, an administrator of a user group may change, through the client agent 507, the configuration data for the user group stored in the configuration service 513.

The configuration service 513 may receive the request, and may change the configuration data. In step 803, the configuration service 513 may send, to the client agent 507, a response indicating that the configuration data for the user group in the configuration service 513 has been changed.

In step 805, the configuration service 513 may send, to the refresh service 515, a message of a configuration data change event. The message may indicate that the configuration data for the user group was changed. The message may include the group identifier of the user group.

In step 807, the refresh service 515 may determine the operation mode for the user group. If the operation mode for the user group comprises a high load operation mode, the refresh service 515 may proceed to step 809. If the operation mode for the user group comprises a low load operation mode, the refresh service 515 may stop at step 807, and might not proceed to step 809.

In step 809, the refresh service 515 may send, to the configuration service 513, a request to obtain the configuration data associated with the user group. In step 811, the configuration service 513 may send, to the refresh service 515, a response indicating the requested configuration data.

The refresh service 515 may receive the response, and may extract the configuration data. In step 813, the refresh service 515 may send, to the shared cache 521, a request to insert the extracted configuration data into the shared cache 521. The shared cache 521 may receive the request, extract the configuration data, and insert the configuration data into the shared cache 521 as a new record. If configuration data associated with the user group is already stored in the shared cache 521 when the shared cache 521 receives the insert request, the shared cache 521 may instead update the configuration data stored in the shared cache 521 with the extracted configuration data. In step 815, the shared cache 521 may send, to the refresh service 515, a response indicating that the configuration data has been inserted into the shared cache 521.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   updating, by a computing device and based on a load of a configuration service satisfying a threshold, a shared cache with configuration data, for a virtual machine, from the configuration service;
   receiving, by the computing device and from a user device, a request to access the virtual machine;
   based on the load of the configuration service satisfying the threshold, sending, by the computing device and to the shared cache, a request associated with the configuration data for the virtual machine;
   receiving, by the computing device and from the shared cache, a response associated with the configuration data for the virtual machine;
   determining, by the computing device and based on the response, the configuration data for the virtual machine; and
   configuring, by the computing device and based on the configuration data for the virtual machine, the virtual machine.

2. The method of claim 1, further comprising:
   determining, based on business hours of an organization associated with the user device, the load of the configuration service.

3. The method of claim 1, further comprising:
   receiving, within a period of time, a plurality of requests to access virtual machines; and
   determining, based on a quantity of the plurality of requests, the load of the configuration service.

4. The method of claim 1, wherein the updating the shared cache with the configuration data for the virtual machine comprises:
   based on determining that the configuration data for the virtual machine is not stored in the shared cache, sending, to the configuration service, a request associated with the configuration data for the virtual machine;
   receiving, from the configuration service, a response associated with the configuration data for the virtual machine;
   determining, based on the response received from the configuration service, the configuration data for the virtual machine; and
   inserting, into the shared cache, the configuration data for the virtual machine.

5. The method of claim 1, wherein the updating the shared cache with the configuration data for the virtual machine is based on detecting a change of the configuration data stored in the configuration service.

6. The method of claim 1, wherein the configuration data for the virtual machine comprises one or more of a Central Processing Unit (CPU) capacity of the virtual machine, a Random Access Memory (RAM) capacity of the virtual machine, or a storage capacity of the virtual machine.

7. The method of claim 1, wherein the shared cache comprises an in-memory database.

8. The method of claim 1, wherein the request associated with the configuration data for the virtual machine comprises:
   an identifier associated with the virtual machine; and
   an identifier of configuration data, for the virtual machine, stored in a local storage of the virtual machine.

9. The method of claim 8, further comprising:
   based on hashing the configuration data stored in the local storage of the virtual machine, generating the identifier of the configuration data stored in the local storage of the virtual machine.

10. The method of claim 8, wherein the shared cache is configured to:
    search, in the shared cache and based on the identifier associated with the virtual machine, the configuration data with which the shared cache is updated;
    generate, based on the configuration data with which the shared cache is updated, an identifier of the configuration data with which the shared cache is updated; and
    based on determining that the identifier of the configuration data stored in the local storage of the virtual machine corresponds to the identifier of the configuration data with which the shared cache is updated, determine that the configuration data stored in the local storage of the virtual machine corresponds to the configuration data with which the shared cache is updated.

11. The method of claim 10, wherein the response indicates that the configuration data stored in the local storage of the virtual machine corresponds to the configuration data with which the shared cache is updated.

12. The method of claim 1, wherein the response indicates that configuration data, for the virtual machine, stored in a local storage of the virtual machine is different from the configuration data with which the shared cache is updated, and wherein the method further comprises:
    replacing the configuration data stored in the local storage of the virtual machine with the configuration data with which the shared cache is updated.

13. The method of claim 1, wherein the configuration data for the virtual machine expires in the shared cache after an expiration period, and wherein the method further comprises:
    based on the load of the configuration service satisfying the threshold, refreshing the expiration period.

14. The method of claim 1, further comprising:
    receiving, by the computing device, a request to access a second virtual machine; and
    based on the load of the configuration service not satisfying the threshold, sending, by the computing device and to the configuration service, a request to determine configuration data for the second virtual machine.

15. A computing device comprising:
    one or more processors; and
    memory storing instructions that, when executed by the one or more processors, cause the computing device to:

update, based on a load of a configuration service satisfying a threshold, a shared cache with configuration data, for a virtual machine, from the configuration service;
receive, from a user device, a request to access the virtual machine;
based on the load of the configuration service satisfying the threshold, send, to the shared cache, a request associated with the configuration data for the virtual machine;
receive, from the shared cache, a response associated with the configuration data for the virtual machine;
determine, based on the response, the configuration data for the virtual machine; and
configure, based on the configuration data for the virtual machine, the virtual machine.

16. The computing device of claim 15, wherein the configuration data for the virtual machine comprises one or more of a Central Processing Unit (CPU) capacity of the virtual machine, a Random Access Memory (RAM) capacity of the virtual machine, or a storage capacity of the virtual machine.

17. The computing device of claim 15, wherein the request associated with the configuration data for the virtual machine comprises:
an identifier associated with the virtual machine; and
an identifier of configuration data, for the virtual machine, stored in a local storage of the virtual machine.

18. One or more non-transitory computer readable media storing computer readable instructions that, when executed, cause a computing device to:
update, based on a load of a configuration service satisfying a threshold, a shared cache with configuration data, for a virtual machine, from the configuration service;
receive, from a user device, a request to access the virtual machine;
based on the load of the configuration service satisfying the threshold, send, to the shared cache, a request associated with the configuration data for the virtual machine;
receive, from the shared cache, a response associated with the configuration data for the virtual machine;
determine, based on the response, the configuration data for the virtual machine; and
configure, based on the configuration data for the virtual machine, the virtual machine.

19. The one or more non-transitory computer readable media of claim 18, wherein the configuration data for the virtual machine comprises one or more of a Central Processing Unit (CPU) capacity of the virtual machine, a Random Access Memory (RAM) capacity of the virtual machine, or a storage capacity of the virtual machine.

20. The one or more non-transitory computer readable media of claim 18, wherein the request associated with the configuration data for the virtual machine comprises:
an identifier associated with the virtual machine; and
an identifier of configuration data, for the virtual machine, stored in a local storage of the virtual machine.

* * * * *